US008649960B2

(12) United States Patent
Bachmaier et al.

(10) Patent No.: US 8,649,960 B2
(45) Date of Patent: Feb. 11, 2014

(54) METHOD AND DATA STORAGE MEDIUM FOR READING AND/OR STORING INJECTOR-SPECIFIC DATA FOR CONTROLLING AN INJECTION SYSTEM OF AN INTERNAL COMBUSTION ENGINE

(75) Inventors: Georg Bachmaier, München (DE); Dominik Bergmann, Sachsenkam (DE); Bernhard Fischer, Töging A. Inn (DE); Johann Görzen, Aindling (DE); Frank Herold, Grosspostwitz (DE); Stefan Lehmann, Regensburg (DE); Thomas Schmid, Regensburg (DE); Christian Tump, München (DE)

(73) Assignee: Siemens Aktiengesellschaft, Munich (DE)

( * ) Notice: Subject to any disclaimer, the term of this patent is extended or adjusted under 35 U.S.C. 154(b) by 1142 days.

(21) Appl. No.: 12/597,150

(22) PCT Filed: Apr. 18, 2008

(86) PCT No.: PCT/EP2008/054703
§ 371 (c)(1), (2), (4) Date: Oct. 22, 2009

(87) PCT Pub. No.: WO2008/132068
PCT Pub. Date: Nov. 6, 2008

(65) Prior Publication Data

US 2010/0138137 A1 Jun. 3, 2010

(30) Foreign Application Priority Data

Apr. 27, 2007 (DE) ......................... 10 2007 020 061

(51) Int. Cl.
*G06F 19/00* (2011.01)
*G06G 7/70* (2006.01)
*F02M 51/00* (2006.01)
*G01M 15/00* (2006.01)

(52) U.S. Cl.
USPC ........... 701/114; 701/115; 701/103; 123/486; 73/114.38; 702/182

(58) Field of Classification Search
USPC .................. 701/103, 114, 115; 123/479, 486; 702/57, 87, 182; 73/114.38, 114.45, 73/114.77
See application file for complete search history.

(56) References Cited

U.S. PATENT DOCUMENTS 6,234,002 B1 * 5/2001 Sisney et al. ................... 73/1.57
6,276,337 B1 * 8/2001 Minato ......................... 123/456

(Continued)

FOREIGN PATENT DOCUMENTS

DE 10117809 A1 10/2002
DE 10244091 A1 4/2004

(Continued)

*Primary Examiner* — Willis R Wolfe, Jr.
*Assistant Examiner* — Anthony L Bacon
(74) *Attorney, Agent, or Firm* — King & Spalding L.L.P.

(57) ABSTRACT

In a method for reading and/or storing injector-specific data for controlling an injection system of an internal combustion engine, an injector is charged by a control unit according to a predeterminable voltage curve and, depending on the case, is discharged directly by the control unit or by a power element located on a data storage medium and the voltage is measured by the control unit and by the data storage medium. Dependent upon a predeterminable voltage curve, a predeterminable amount of data is stored or read on a memory unit of the data storage medium.

23 Claims, 3 Drawing Sheets

(56) References Cited

U.S. PATENT DOCUMENTS

| | | | | |
|---|---|---|---|---|
| 7,456,545 | B2 | 11/2008 | Huber et al. | 310/316.03 |
| 2005/0126543 | A1 | 6/2005 | Manzone et al. | 123/490 |
| 2005/0206881 | A1 | 9/2005 | Shiode | 356/124 |
| 2008/0059038 | A1 | 3/2008 | Yoshida et al. | 701/99 |
| 2010/0275885 | A1* | 11/2010 | Becker et al. | 123/478 |

FOREIGN PATENT DOCUMENTS

| | | | | |
|---|---|---|---|---|
| DE | 102005001425 | A1 | 7/2006 | |
| DE | 10007691 | B4 | 10/2006 | |
| DE | 102006029083 | B3 | 4/2007 | |
| EP | 1026384 | A1 | 8/2000 | |
| EP | 1898077 | A2 | 3/2008 | |
| JP | 9139094 | A | 5/1997 | F02D 45/00 |
| JP | 2000220508 | A | 8/2000 | F02D 41/24 |
| JP | 2003013783 | A | 1/2003 | F02D 41/20 |
| JP | 2003525376 | A | 8/2003 | F02D 41/20 |
| JP | 2005201249 | A | 7/2005 | F02D 41/20 |
| JP | 2007504386 | A | 3/2007 | F02D 41/24 |
| JP | 2008057413 | A | 3/2008 | F02D 45/00 |
| WO | WO 0063545 | A | 10/2000 | |
| WO | WO 2007045550 | A1 | 4/2007 | |

* cited by examiner

METHOD AND DATA STORAGE MEDIUM FOR READING AND/OR STORING INJECTOR-SPECIFIC DATA FOR CONTROLLING AN INJECTION SYSTEM OF AN INTERNAL COMBUSTION ENGINE

CROSS-REFERENCE TO RELATED APPLICATIONS

This application is a U.S. National Stage Application of International Application No. PCT/EP2008/054703 filed Apr. 18, 2008, which designates the United States of America, and claims priority to German Application No. 10 2007 020 061.9 filed Apr. 27, 2007, the contents of which are hereby incorporated by reference in their entirety.

TECHNICAL FIELD

The invention relates to a method for reading out and/or storing injector-specific data and a data storage medium that can be actuated to this end.

BACKGROUND

Fuel injection apparatuses for operating an internal combustion engine have been known generally for many years. In the case of a so-called common rail injection system the fuel is fed into the respective combustion chamber of the internal combustion engine by injectors, in particular by piezo injectors. Here combustion quality is a function among other things of the injection accuracy of the injectors. In order to be able to comply with requirements, such as smaller quantity tolerances for example, it is necessary to measure every individual injector during manufacture. The calibration data determined in this process, which is stored in a control unit, can then be used to actuate the injector accordingly. During initial assembly and in particular when the injectors and/or the control unit is/are replaced in a workshop, the calibration data has to be transferred from the injectors to the control unit once again. The possibility of communication between the injectors and the control unit must be ensured for this purpose.

A method for storing and/or reading out data of a fuel injection system of an internal combustion engine is known from the publication DE 100 07 691 B4, wherein injector-specific data stored in a data storage medium is used to control the fuel injection system. Here the data storage medium is connected to the control unit in a first time segment and during a second time segment, before the internal combustion engine is put into operation, it is isolated electrically and/or mechanically from the control unit.

There is however a risk here that human error when assembling the data storage media may result in a data storage medium being assigned to the wrong injector, or incorrect assembly may mean that the data cannot be read out.

SUMMARY

According to various embodiments, a method of the type mentioned in the introduction can be optimized in respect of the storing and reading out of injector-specific data and to provide a data storage medium for storing and/or reading out injector-specific data, which only has to be assembled once and with which an electrical connection between the control unit and the data storage medium does not have to be isolated.

According to an embodiment, a method for storing and/or reading out injector-specific data for controlling an injection system of an internal combustion engine, may comprise that an injector voltage value is measured and a predeterminable quantity of data is read out or stored depending on whether the respectively determined voltage value is within or outside a predeterminable limit region for at least a predetermined time period.

According to a further embodiment, a predeterminable quantity of data can be read out or stored, if the respectively determined voltage value is above an upper threshold value for a predeterminable first time period and after the first time period the respectively determined voltage value is below the lower threshold value for a predeterminable second time period. According to a further embodiment, a predeterminable quantity of data can be stored, if the respectively determined voltage value is above an upper threshold value for a first time period greater than 8 ms and after the first time period of 8 ms the respectively determined voltage value is below the lower threshold value for the second time period of 1 ms. According to a further embodiment, a predeterminable quantity of data can be read out, if the respectively determined voltage value is above an upper threshold value for a first time period greater than 5 ms and after the first time period of 5 ms the respectively determined voltage value is below the lower threshold value for a second time period of 1 ms. According to a further embodiment, the limit region, which is defined by the lower and upper threshold values, may be between the voltage values 0 V and 30 V. According to a further embodiment, the injector can be charged, if the voltage value of the injector drops below a predetermined lower threshold value. According to a further embodiment, a predeterminable quantity of data can be read out or stored before, during or after the shutting down of the internal combustion engine. According to a further embodiment, data packets of 4 bits each plus a stop bit can be transmitted. According to a further embodiment, a 0 value of a bit can be identified in that after a decision whether a quantity of data is to be read out or stored, the measured injector voltage value is above the upper threshold after a third time period, the third time period being smaller than the time period required to read out or store one bit. According to a further embodiment, a 1 value can be identified in that after a decision whether a quantity of data is to be read out or stored, the measured injector voltage value is below a lower threshold after a predeterminable third time period, the third time period being smaller than the time period required to read out or store one bit. According to a further embodiment, the exchange of data between the data storage medium and the control unit can be synchronized with a stop bit. According to a further embodiment, the synchronization of data between the control unit and the data storage medium may be effected based on a code or a predeterminable bit pattern. According to a further embodiment, data transmission can be checked by means of error correction methods, in particular parity checks, checksums or multiple transmissions.

According to another embodiment, a data storage medium for storing and/or reading out injector-specific data by means of a control unit, for controlling an injection system of an internal combustion engine, may comprise a measuring unit for continuous measurement of the voltage present at the injector, the data storage medium having a memory unit for reading out and/or storing the quantity of data and a power unit for discharging the injector and it being possible for a predeterminable quantity of data to be read out of the memory unit or stored in it by means of the control unit, depending on whether the voltage value measured respectively at the measuring unit is within or outside a predeterminable limit region for a predetermined time period.

According to a further embodiment, the injectors can be charged by the control unit. According to a further embodiment, the data storage medium can be arranged within an injector housing or is connected securely to the injector housing. According to a further embodiment, the data storage medium can be embodied as an ASIC. According to a further embodiment, the data storage medium may have at least one interface for the exchange of data with a measuring unit and/or an actuator unit. According to a further embodiment, the data storage medium may have at least one bus interface for the exchange of data. According to a further embodiment, the data storage medium may have an interface with an additional energy supply. According to a further embodiment, the structure of the data storage medium may correspond to that of a discharge resistor. According to a further embodiment, a power supply unit may be provided to supply energy to the data storage medium, being connected to the injector or being integrated directly into the data storage medium. According to a further embodiment, a power supply unit can be provided to supply energy to the data storage medium, being connected to the injector or being integrated directly into the data storage medium, the power supply unit only being activated by an actuator assigned to the data storage medium when the measured injector voltage has a predeterminable data pattern.

BRIEF DESCRIPTION OF THE DRAWINGS

Details of the invention are described in more detail below with reference to the drawings, in which.

DETAILED DESCRIPTION

Figure 1:
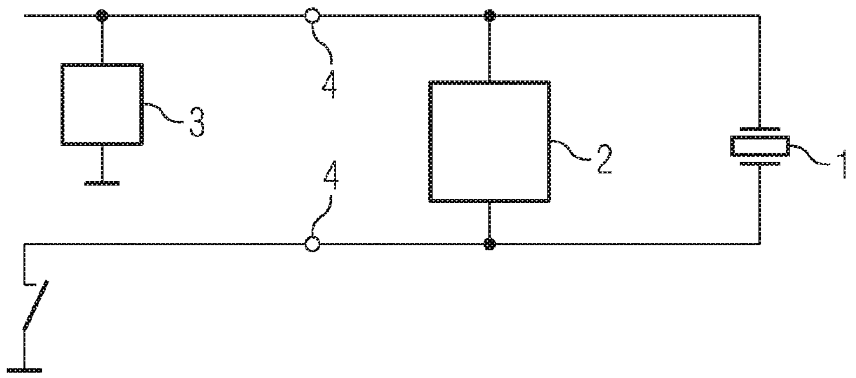
FIG. 1: shows a circuit arrangement with a data storage medium and an injector in a first embodiment.

The advantages achieved with the various embodiments consist in particular in that no additional circuit measures, e.g. cabling or plug-in pins, and/or no additional components, e.g. write devices and read devices, are required to ensure communication between the control unit and the data storage medium. Only modified software on the control unit is required, to receive data from a measuring unit and to send the data to the data storage medium. The quantity of data is transferred between the data storage medium and the control unit here on the lines to which the injector is connected.

In a further embodiment the data storage medium is identical in structure to the discharge resistor already used to date in the injector. The functionality of the discharge resistor is integrated into the data storage medium. It is therefore not necessary to change the settings of the manufacturing machines during production of the injectors, as now rather than a discharge resistor a data storage medium of identical structure is used. It is also possible to use a data storage medium with a different structure from that of the discharge resistor, saving on costs when large numbers are manufactured.

A power unit for discharging the injectors during the normal injection operation is also located in its entirety within the data storage medium. This has the advantage that the power loss in the control unit is reduced. It also reduces injector-specific electromagnetic interference. This is of particular advantage for overlapping multiple injections. It allows them to be configured much more flexibly.

In a further embodiment, direct assignment of injector-specific data, which is stored on the data storage medium, and the injectors is always ensured, as one data storage medium is assigned respectively to each injector. This also allows future plausibility requirements required by the legislator to be met.

In a further embodiment, a predeterminable quantity of data is read out or stored before or during or after the shutting down of the internal combustion engine. This reduces the requirements for the components of the data storage medium and/or the number of components of the data storage medium can be decreased.

In a further embodiment, the data storage medium can be connected directly to the high voltage line connected to the injector. A power supply unit on the data storage medium is designed so that on the one hand it supplies the injector with the necessary voltage, for example 3.3 V, and on the other hand it can be subjected to an injector-specific actuation voltage, for example 350 V.

It has also proven advantageous that the present method can be applied to all systems, in which an energy-storing element is connected to a control unit. In particular also for magnetic components, for example magnetic injectors or solenoid valves, when according to the duality principle voltage is replaced with current and therefore all voltage signals are replaced with current signals, parallel with series circuits and the capacitive piezo with the inductive coil.

In a further embodiment, the transmission reliability of the data is increased by error correction methods, in particular parity checks, checksums or multiple transmissions.

In a further embodiment, operating data can also be stored in the data storage medium so that it can then be analyzed in the event of returns, recall actions or replacement programs and quality improvement measures can be initiated as a function of this operating data.

FIG. 1 shows a circuit arrangement of a data storage medium 2 and an injector 1. The circuit arrangement includes an injector 1, which can be charged to a voltage value of 0 V to 30 V by a control unit (not shown). The injector 1 is discharged here by a power unit in the data storage medium 2 or by the control unit, with the data storage medium 2 connected parallel to the injector 1. The data storage medium 2 is advantageously embodied as an ASIC. When the injector is discharged by the power unit, the injector voltage is measured by means of a measuring unit 3. The data storage medium 2 and the injector 1 are connected by means of connecting lines 4 to the control unit (not shown).

Figure 2:
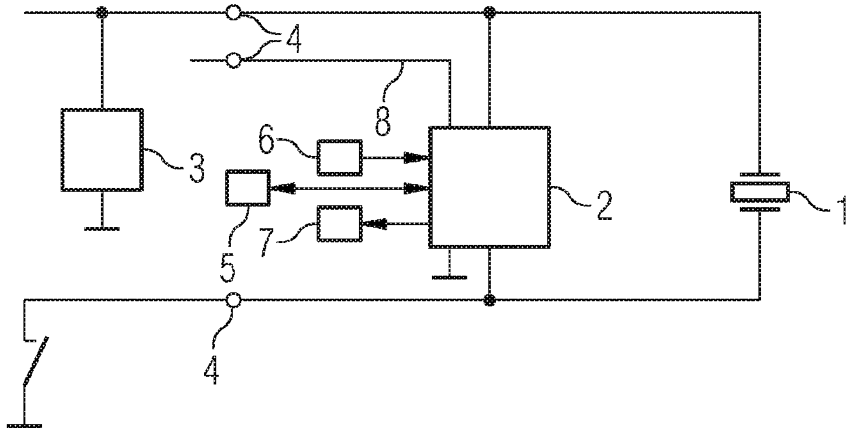
FIG. 2: shows a circuit arrangement with a data storage medium and an injector according to FIG. 1 in a second embodiment.

FIG. 2 shows a circuit arrangement with a data storage medium and an injector according to FIG. 1 in a second embodiment. The data storage medium 2 here has additional connections. Thus the data storage medium 2 can have a connection for an additional energy supply line 8. Further connections are also provided on the data storage medium 2, by way of which measured values can be received from at least one measuring unit 6. Further connections on the data storage medium 2 serve to actuate actuators 7 and/or for the exchange of data with a data unit 5. A bus line is preferably used for the exchange of data here.

Figure 3:
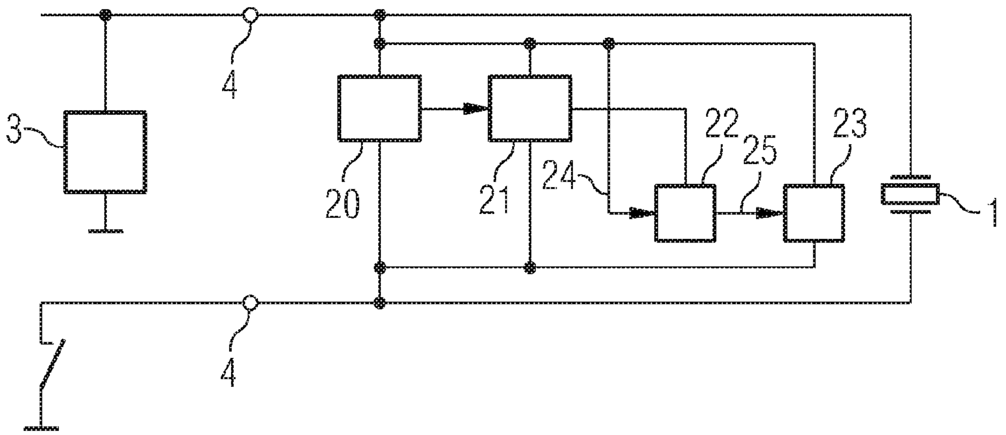
FIG. 3: shows a detailed embodiment of the circuit arrangement according to FIG. 1, FIG. 4: shows a voltage curve, by means of which a quantity of data is stored or read out.

FIG. 3 shows a circuit arrangement with an injector 1 and the individual components of the data storage medium 2. The data storage medium 2 has a power unit 23, which is used to discharge the injector 1. Control signals 25 from a memory unit 22 connected upstream of the power unit 23 determine the time and duration for the discharging of the injector 1. The data storage medium also optionally has an activator 20 connected parallel to the injector 1, which only activates a power supply unit 21 when a stored injector voltage pattern is present. This power supply unit 21 is connected here to the line present at the injector 1 and supplies the memory unit 22 with energy. The overwritable calibration data of the injector 1 for example is stored in the memory unit 22.

The exchange of data between the memory unit 22 and the control unit (not shown) takes place by way of the same lines as the energy supply to the data storage medium. It is thus transmitted to the memory unit 22 by means of a signal by way of a line 24 before an exchange of data with the control unit (not shown) whether calibration data of the injector 1 is read out or stored. The line 24 here corresponds to a branch of the line present at the power unit 23.

Figure 4:
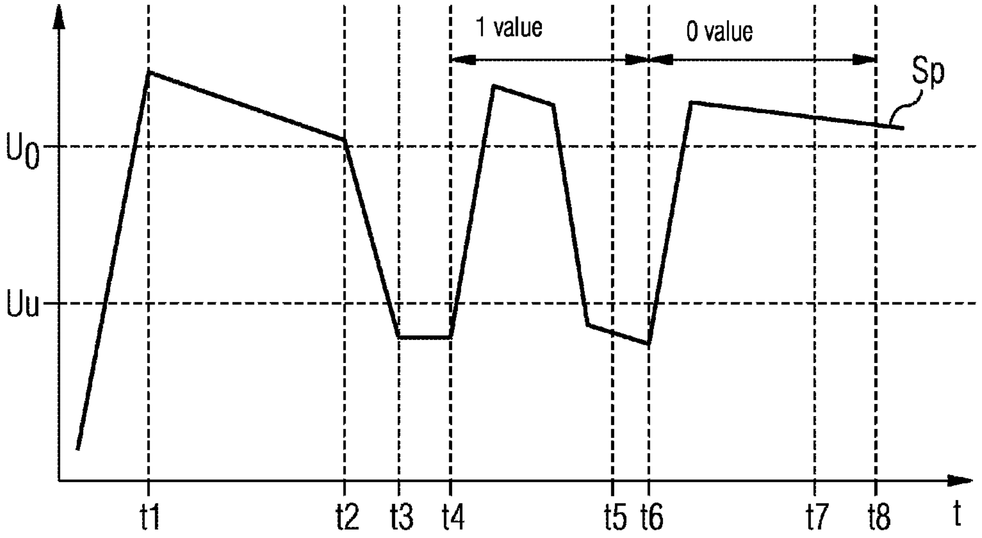

FIG. 4 shows a temporal voltage curve Sp for a storage or read-out process of a quantity of data. A limit region is defined for example between 0 V and 30 V by an upper threshold value Uo and a lower threshold value Uu. It has also proven advantageous that the following equation applies:

$$0\text{ V}<Uu<Uo<30\text{ V}$$

This limit region is selected such that on the one hand the injector does not yet inject and on the other hand the control unit can charge the injector and measure its voltage.

The data storage medium is informed by the control unit based on the voltage curve measured at the injector whether a quantity of data is to be read out or stored. The voltage curve at the injector is determined here by the charging and/or discharging of the injector. The injector is always charged by the control unit while said injector is discharged by the control unit when the quantity of data is stored and discharged by the power unit when the quantity of data is read out. Also the injector is discharged in a time period between t2 and t3 and during synchronization by the control unit.

Reading out of the quantity of data is identified by the data storage medium if the first time period defined by the two times t1 and t2 is greater than a stored first setpoint time period and the voltage curve measured at the injector is greater than the upper threshold value Uo. Also the voltage curve Sp must be below the limit region defined by the lower threshold value Uu for a second time period between the times t3 and t4. It has proven advantageous here for the first setpoint time period, in which the voltage curve is greater than an upper threshold value Uo, to be 5 ms and the second time period, in which the voltage curve is below the lower threshold value Uu, to be 1 ms.

The data storage medium also identifies that a quantity of data is to be stored, if the first time period between the two times t1 and t2 is greater than a stored second setpoint time period. The voltage curve Sp must also be below the lower threshold value Uu for the second time period between the predeterminable times t3 and t4. It has proven advantageous here for the first setpoint time period, in which the voltage curve is greater than an upper threshold value Uo, to be 8 ms and the second time period, in which the voltage curve is below the lower threshold value Uu, to be 1 ms.

The voltage drop between the times t1 and t2 or between the times t3 and t4 is due to the discharging of the injector by the power supply unit 21 of the data storage medium.

From the time t4, at which the voltage curve is below the lower threshold value Uu, the injector is charged by the control unit and the voltage curve Sp therefore rises above the upper threshold value Uo again. After it has been determined in the time period between the times t1 and t4 whether reading out or storing of a quantity of data takes place, this quantity of data must be read out or stored in the following steps.

For a predeterminable third time period after it is determined whether reading out or storing takes place, a predeterminable quantity of data is read out or stored respectively. The quantity of data read out or stored is for example packets of five bits each, with the fifth bit being used in each instance as a stop bit for synchronizing the data. It is also conceivable for data synchronization to be performed without a stop bit, based on a stored code, for example the Manchester code.

FIG. 4 shows the reading out or storing of one bit respectively in the time period between the times t4 and t6 and for the time period between the times t6 and t8. The stored or read out bit here only contains two possible information items. The value contained in the bit can only have a 0 value or a 1 value, it being possible to predetermine the time period required to read out or store an individual bit.

It is now possible to use the measured injector voltage curve to identify whether a bit contains a 0 value or a 1 value. A 1 value is identified here if at the time t5 the voltage value is below the lower voltage value. The time interval between the times t4 and t5 can also be predetermined and is smaller than the time period between the times t4 and t6, which is available for reading out or storing one bit. Starting from the time t6 when the injector is charged, at time t7 the voltage value is above the upper voltage value. From this the data storage medium identifies that a 0 bit is to be read out or stored. The time interval between the times t6 and t7 here corresponds to the time interval between the times t4 and t5. The time interval between the times t6 and t7 is in turn smaller than the time interval between the times t6 and t8, which is available for reading out or storing one bit. It has proven advantageous for the time period between the times t4 and t5 to be 50% of the time period between the times t4 and t6.

Figure 5:
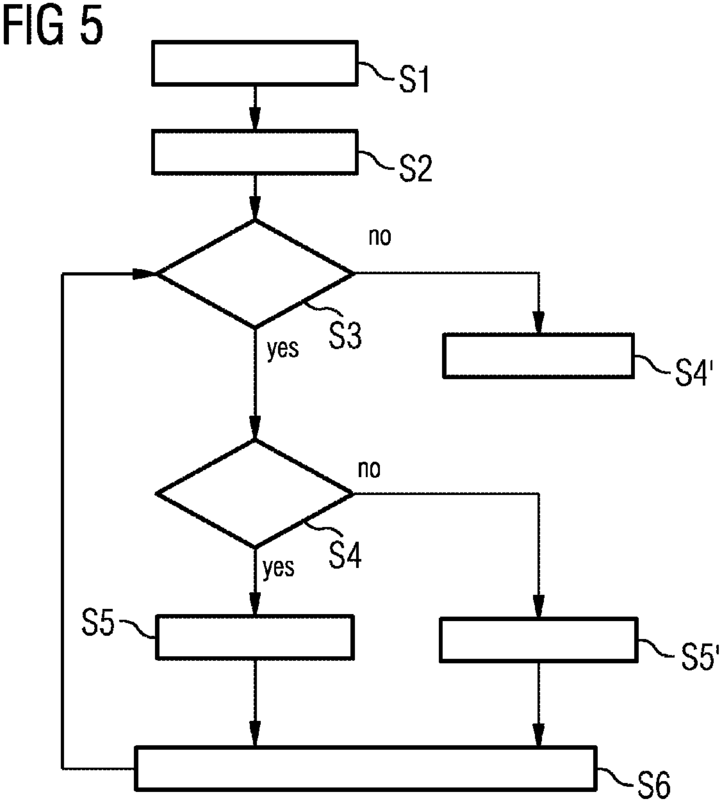
FIG. 5: shows a flow diagram for reading out a quantity of data from the data storage medium.

FIG. 5 shows a flow diagram for reading out a quantity of data from the data storage medium. In step S1 the activator and therefore the voltage unit is activated, if a certain voltage pattern is measured at the injector. In step S2 there is a waiting period until the voltage curve is above the upper threshold value for a predeterminable time period. It is also checked in step S3 whether a counter value is smaller than a stored value. The counter value here is a function of the number of read bits. It is increased each time a bit is read. The counter value can then be used to identify when a stop bit is sent for synchronization purposes. This happens as soon as the counter value is greater than a stored value. In this instance in step S4' a stop bit for synchronizing the quantity of data is read out and the counter value is reset to an initial value.

Should the counter value be smaller than the stored value, it is checked in step S4 whether the voltage curve is below the predetermined upper threshold value. If the voltage curve is greater than the upper threshold value, in step S5 a bit with the assigned 0 value is read out, otherwise in step S5' a bit with the assigned 1 value is read out. Finally in step S7 the counter value from step S4 is increased by one value.

Figure 6:
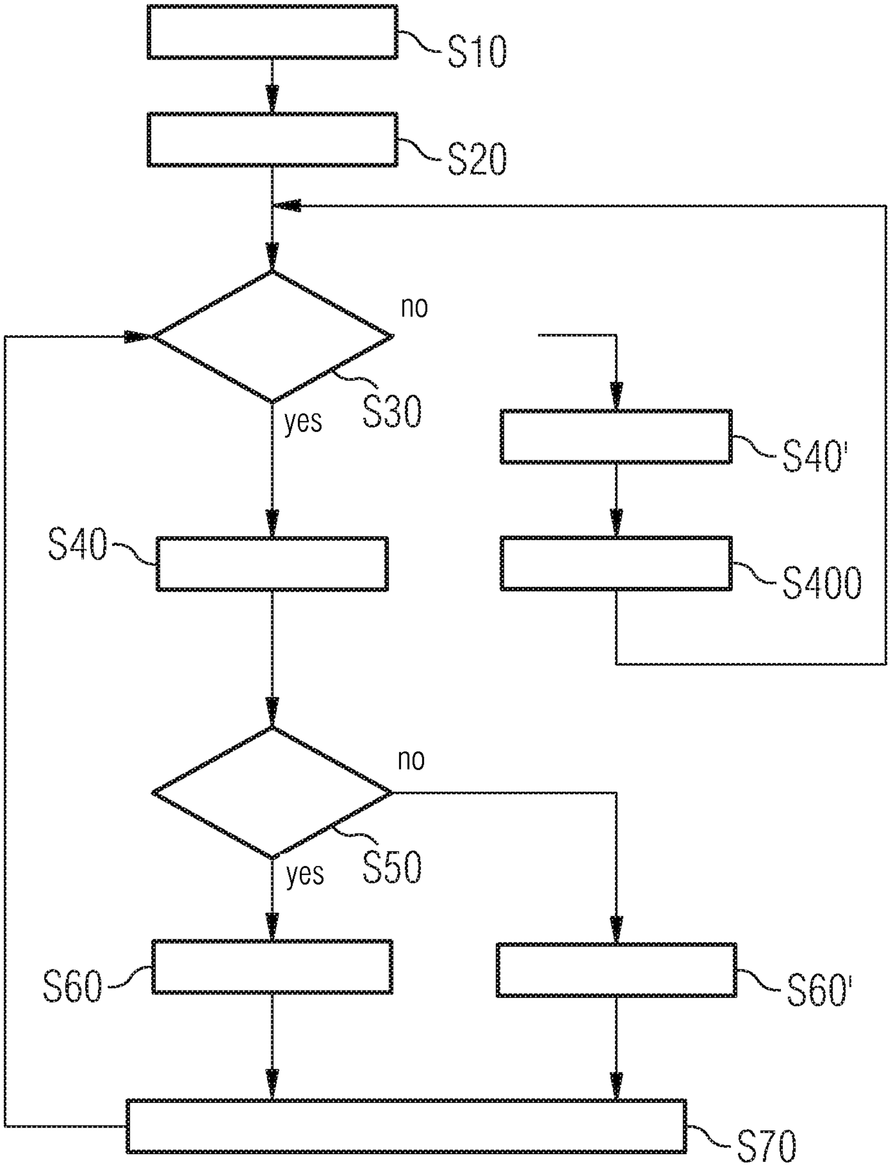
FIG. 6: shows a flow diagram for storing a quantity of data in the data storage medium.

FIG. 6 shows a flow diagram for storing a quantity of data in the data storage medium. In step S10 the activator and therefore the power supply unit is activated. In step S20 there is a waiting period until the voltage curve is above the upper threshold value for a predeterminable time period.

It is also checked in step S30 whether a counter value is smaller than a stored value. The counter value here is a function of the number of read bits. It is increased each time a bit is stored. The counter value can therefore be used to identify when a stop bit is sent for synchronization purposes. Should the counter value here be greater than the stored value, in step S40' there is a waiting period until the measured voltage curve has dropped below the predeterminable lower threshold value. The counter value is also reset to its initial point in step S400.

If the counter value is smaller than the stored value, there is a predeterminable waiting period in step S40 until it is checked in step S50 whether the measured voltage curve has dropped below the upper threshold value.

Should the voltage curve have dropped below the upper threshold value, in step S60 a bit with the assigned 1 value is stored in the data storage medium. However if the measured voltage curve has not dropped below the upper threshold value, in step S60 a bit with the assigned 0 value is stored in the data storage medium. Finally in step S80 the counter value from step S30 is increased.

What is claimed is:

1. A method for at least one of storing and reading out injector-specific data for controlling an injection system of an internal combustion engine, comprising the steps of:

measuring an injector specific voltage value; and

Reading out or storing a predeterminable quantity of data depending on whether the respectively determined voltage value is within or outside a predeterminable limit region for at least a predetermined time period.

2. The method according claim 1, wherein a predeterminable quantity of data is read out or stored, if the respectively determined voltage value is above an upper threshold value for a predeterminable first time period and after the first time period the respectively determined voltage value is below the lower threshold value for a predeterminable second time period.

3. The method according to claim 1, wherein a predeterminable quantity of data is stored, if the respectively determined voltage value is above an upper threshold value for a first time period greater than 8 ms and after the first time period of 8 ms the respectively determined voltage value is below the lower threshold value for the second time period of 1 ms.

4. The method according to claim 1, wherein a predeterminable quantity of data is read out, if the respectively determined voltage value is above an upper threshold value for a first time period greater than 5 ms and after the first time period of 5 ms the respectively determined voltage value is below the lower threshold value for a second time period of 1 ms.

5. The method according to claim 1, wherein the limit region, which is defined by the lower and upper threshold values, is between the voltage values 0 V and 30 V.

6. The method according to claim 1, wherein the injector is charged, if the voltage value of the injector drops below a predetermined lower threshold value.

7. The method according to claim 1, wherein a predeterminable quantity of data is read out or stored before, during or after the shutting down of the internal combustion engine.

8. The method according to claim 1, wherein data packets of 4 bits each plus a stop bit are transmitted.

9. The method according to claim 8, wherein a 0 value of a bit is identified in that after a decision whether a quantity of data is to be read out or stored, the measured injector voltage value is above the upper threshold after a third time period, the third time period being smaller than the time period required to read out or store one bit.

10. The method according to claim 8, wherein a 1 value is identified in that after a decision whether a quantity of data is to be read out or stored, the measured injector voltage value is below a lower threshold after a predeterminable third time period, the third time period being smaller than the time period required to read out or store one bit.

11. The method according to claim 1, wherein the exchange of data between the data storage medium and the control unit is synchronized with a stop bit.

12. The method according to claim 1, wherein the synchronization synchronization of data between the control unit and the data storage medium is effected based on a code or a predeterminable bit pattern.

13. The method according to claim 1, wherein data transmission is checked by means of error correction methods, in particular parity checks, checksums or multiple transmissions.

14. A data storage medium for at least one of storing and reading out injector-specific data by means of a control unit, for controlling an injection system of an internal combustion engine, comprising:

a measuring unit for continuous measurement of the voltage present at the injector, wherein the data storage medium comprises a memory unit for at least one of reading out and storing the quantity of data; and a power unit for discharging the injector and the control unit is operable to read out or store a predeterminable quantity from or into the memory unit depending on whether the voltage value measured respectively at the measuring unit is within or outside a predeterminable limit region for a predeterminable time period.

15. The data storage medium according to claim 14, wherein the injectors can be charged by the control unit.

16. The data storage medium according to claim 14, wherein the data storage medium is arranged within an injector housing or is connected securely to the injector housing.

17. The data storage medium according to claim 14, wherein the data storage medium is embodied as an ASIC.

18. The storage medium according to claim 14, wherein the data storage medium has at least one interface for the exchange of data with at least one of a measuring unit and an actuator unit.

19. The data storage medium according to claim 14, wherein the data storage medium has at least one bus interface for the exchange of data.

20. The data storage medium according to claim 14, wherein the data storage medium has an interface with an additional energy supply.

21. The data storage medium according to claim 14, wherein the structure of the data storage medium corresponds to that of a discharge resistor.

22. The data storage medium according to claim 14, wherein a power supply unit is provided to supply energy to the data storage medium, being connected to the injector or being integrated directly into the data storage medium.

23. The data storage medium according to claim 14, wherein a power supply unit is provided to supply energy to the data storage medium, being connected to the injector or being integrated directly into the data storage medium, the power supply unit only being activated by an actuator assigned to the data storage medium when the measured injector voltage has a predeterminable data pattern.

* * * * *